United States Patent [19]

Cole et al.

[11] 4,399,652

[45] Aug. 23, 1983

[54] LOW BTU GAS COMBUSTOR

[75] Inventors: Rossa W. Cole, East Rutherford; Anthony Leto, Franklin Lakes, both of N.J.

[73] Assignee: Curtiss-Wright Corporation, Wood-Ridge, N.J.

[21] Appl. No.: 294,918

[22] Filed: Aug. 21, 1981

Related U.S. Application Data

[63] Continuation-in-part of Ser. No. 248,970, Mar. 30, 1981, abandoned.

[51] Int. Cl.³ .............................................. F02C 7/224
[52] U.S. Cl. ............................ 60/39.465; 60/736/746
[58] Field of Search ............ 60/736, 746, 738, 39.465, 60/737

[56] References Cited

U.S. PATENT DOCUMENTS

| | | | |
|---|---|---|---|
| 2,621,477 | 12/1952 | Powter et al. | 60/737 X |
| 3267676 | 8/1966 | Sneeden | 60/738 |
| 3377803 | 4/1968 | Prachar | 60/736 |
| 3407596 | 10/1968 | Dasbach et al. | 60/737 |
| 3577730 | 5/1971 | Oliphant | 60/738 |
| 4262482 | 4/1981 | Roffe et al. | 60/736 |

*Primary Examiner*—Louis J. Casaregola
*Assistant Examiner*—Donald E. Stout
*Attorney, Agent, or Firm*—Stephen A. Roen; Arthur L. Frederick

[57] ABSTRACT

A combustion chamber for burning low BTU fuel comprising a generally cylindrical casing having adjacent outer and inner annular spaces defined by outer, intermediate and inner walls, the spaces intercommunicating at the downstream end of the casing thereby providing a U-shaped flow path. The outer annular space traverses the entire length of the casing while the inner space extends to the approximate mid-point of the casing, thereby communicating with internally disposed combustion units. In operation, fuel as coolant is fed to the outer space at the upstream end, traverses the U-shaped flow-path thus making a double pass around the combustion zone of the combustion chamber and thence to the combustion units for ignition. Improved cooling is obtained.

2 Claims, 3 Drawing Figures

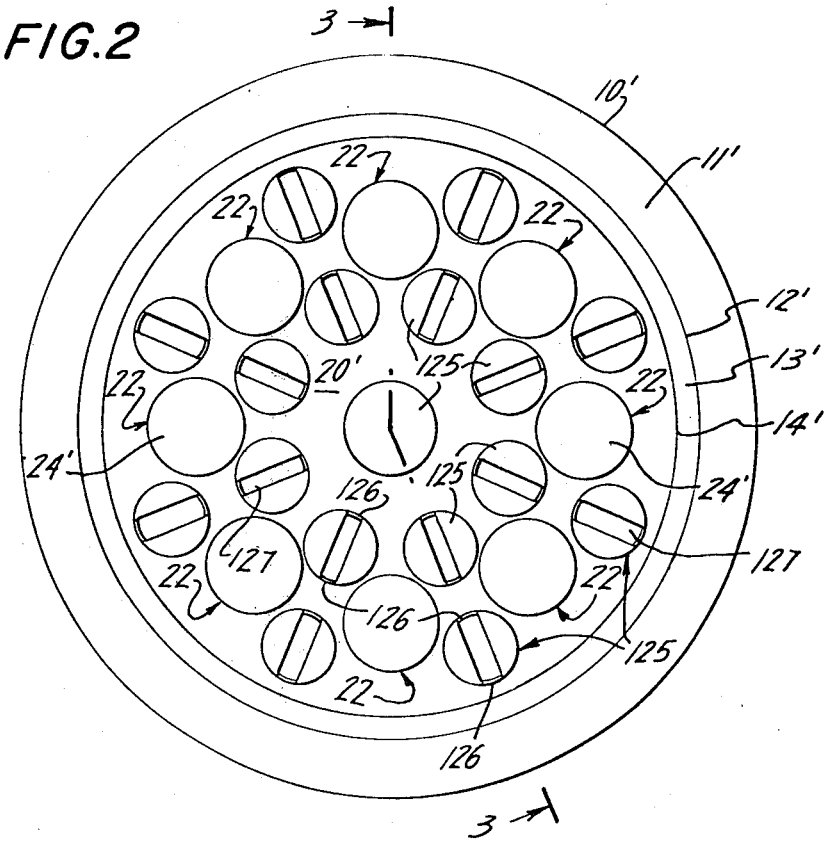
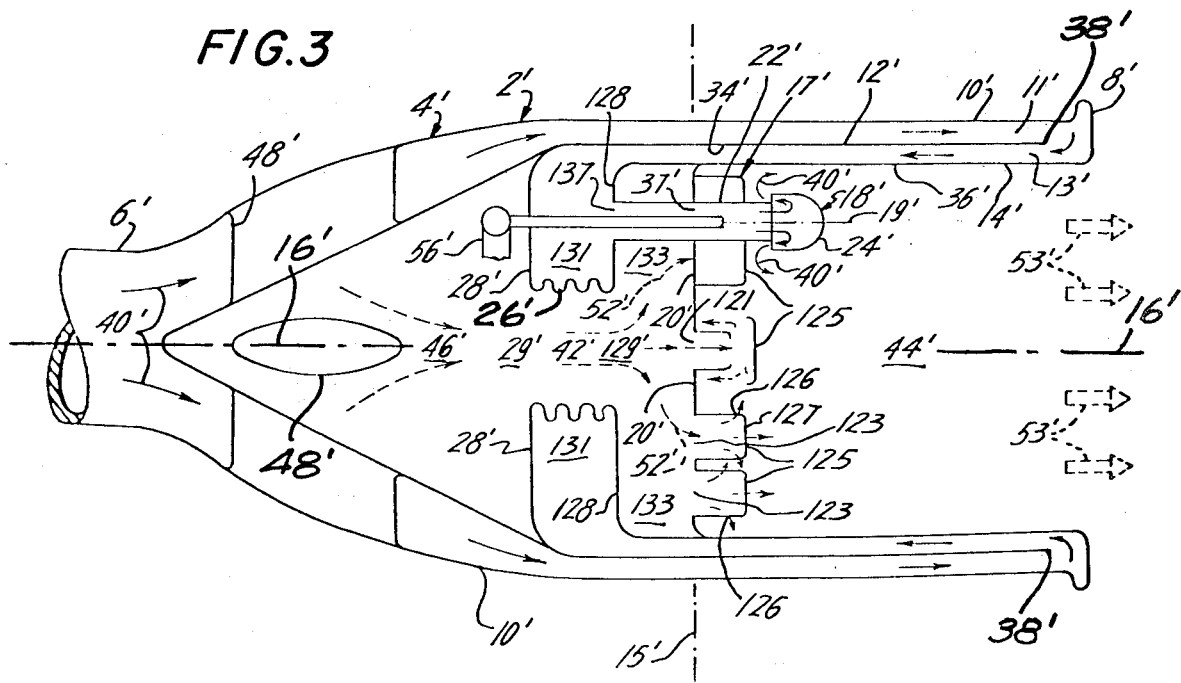

LOW BTU GAS COMBUSTOR

This patent application is a continuation-in-part application of patent application Ser. No. 248,970, filed Mar. 30, 1981, and now abandoned.

This invention relates to gas combustors and particularly to low BTU gas combustors of the can type.

BACKGROUND OF THE INVENTION

Gas combustors as described in the prior art are usually of the can or annular type designed to accommodate liquid and/or gaseous oxidant and fuel feeds. Generally, can combustors are advantageous in that they have better maintainability features. Efficient cooling of the can combustion chamber is essential in order to minimize disabling of the combustor liner or other structural components which would normally be subject to severe thermal stress. Accordingly, excess amounts of cooling air oxidant are necessarily used to moderate thermal effects within the combustion chamber and to cool the exhaust gases. In contrast to the high heating value fuels, e.g. natural gas, low BTU gas fuels, such as coal gas, require nearly stoichiometric fuel to air to obtain desired high temperatures (2600°–3000° F.), leaving little air for cooling purposes.

To negotiate critical cooling requirements, combustors of various designs are proposed in the art. Generally, the coolant air is fed to the combustor at predetermined points to achieve one or more of a number of objectives including, for example, cooling of the exhaust gases, provision of an air blanket or film immediately adjacent the combustor liner for heat and flame protection purposes, direction and control of the flame developed in the combustion zone to limit its size and configuration, etc. In other embodiments, air or fuel is introduced into air annular space defined by the liner and outer wall at a point downstream and passed forwardly to the fuel feed end of the combustion chamber, portions of the air being directed to the inner combustion zone at one or more intermediate points along its path. See for example, U.S. Pat. Nos. 3,077,073; 4,211,073 and 4,236,378.

Apparatus of the general type described in the referenced patents, however, are designed either for use with the high heating value fuels and use excess air over combustion requirements for cooling purposes. Moreover, the cooling effects attainable are often limited as a matter of design and inherent thermodynamic relationships and particularly since liner cooling is largely dependent on the available amount of air. Accordingly, problems associated with overall power plant cycle efficiency, combustor temperature, liner useful life and turbine blade and vane cooling are not necessarily avoided or effectively mitigated and particularly in the case of can type combustors.

Thus, a primary object of this invention is to provide a combustion chamber of the can type beneficially adapted for use with low BTU fuels wherein the foregoing and related problems are eliminated or at least substantially mitigated.

Another object is to provide such an apparatus wherein significant cooling effects are achieved despite relatively small quantities of available cooling air.

Still another object of the present invention is to provide such an apparatus wherein effective increase in overall power plant cycle and combustion efficiency, combustion liner useful life and efficiency of blade and vane cooling, are achieved.

A further object of the present invention is to provide such an apparatus enabling the use of higher combustor temperatures approaching the stoichiometric maximum for the particular low BTU gas fuel selected, thereby providing increased power output.

Other features, objects and advantages will become apparent upon reference to the succeeding detailed description of the invention and to the drawings illustrating the embodiments thereof.

SUMMARY OF THE INVENTION

The foregoing and related objects are attained in accordance with the invention which, in its broader aspects, provides a combustion chamber for burning low BTU fuel having a proximal, fuel feed end and longitudinally opposed distal end comprising a generally cylindrical casing having a plurality of internally disposed fuel combustor units supported by said casing approximately mid-length thereof and arranged in laterally opposed relationships to define a channel therebetween having a longitudinal axis coincident with the longitudinal axis of said combustion chamber, said casing comprising spaced apart outer and inner walls joined at their distal ends and an intermediate wall, adjacent walls defining respective inner and outer annular spaces intercommunicating beyond the distal end portion of said intermediate wall, said inner wall extending from said distal end to said combustor units and forming a unitary structure therewith thereby defining a continuous, essentially U-shaped flow space intercommunicating said proximal fuel feed end and said combustor units, said units in combination with inner and intermediate walls defining, respectively, a combustion zone distally of said combustion units and an oxidant zone proximally of said units, means for admitting fuel as a coolant to said outer annular space at said proximal end and means for admitting oxidant to said oxidant and combustion zones, said zones intercommunicating through said channel.

The invention is based upon the discovery that an efficient gas turbine power system suitable for generating electricity using low BTU fuel such as coal gas, etc., in conjunction with a can type combustor is provided when the feed fuel itself is used as the primary coolant medium and is distributed circumferentially about the combustion chamber in accordance with the parameters of the invention as described in detail infra.

BRIEF DESCRIPTION OF THE DRAWINGS

FIG. 2 schematically illustrates a distal end view of a combustor chamber in accordance with a preferred embodiment of the invention; and FIG. 3 schematically illustrates an open plan view of the combustion chamber along the line 3—3 of FIG. 2.

DETAILED DESCRIPTION OF THE INVENTION

Figure 1:
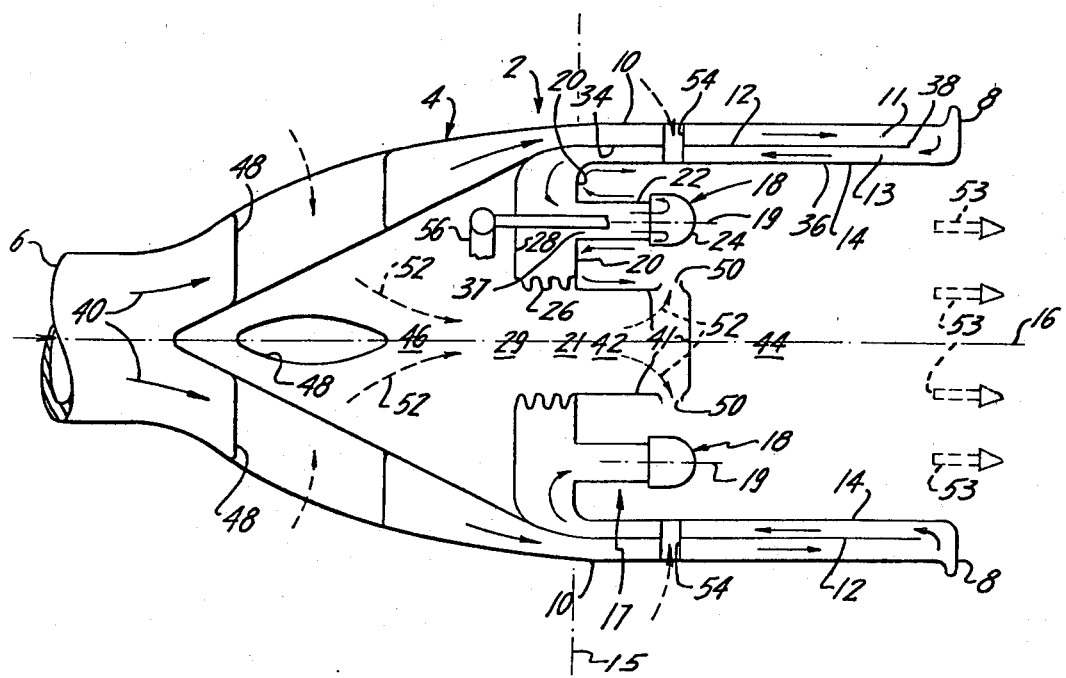
FIG. 1 schematically illustrates an open plan view of a combustion chamber in accordance with one embodiment of the invention.

Referring now to FIG. 1, a combustion chamber generally designated 2, and here illustrated as being of essentially cylindrical cross-section, comprises a casing 4 terminating in necked down proximal fuel feed end 6 and longitudinally opposed distal end 8. Casing 4 consists of spaced apart outer wall 10, intermediate wall 12 and inner or liner wall 14; outer and inner annular spaces 11 and 13, respectively, are defined by outer and intermediate walls 10 and 12, respectively, and intermediate and inner walls 12 and 14, respectively. The intermediate wall 12 extends from distal end 8 to near the proximal fuel feed end 6. The inner or liner wall 14 extends from distal end 8 to a traverse plane 15, which plane is perpendicularly oriented with respect to a major or longitudinal axis 16 of combustion chamber 2. A combustion assembly, generally designated 17 and having a longitudinal axis which is coincidental with major axis 16, is provided and is disposed within and supported by casing 4. The combustion assembly 17 comprises a lateral, annular-shaped wall or headplate 20 having a single centrally located, circular opening 21, a number of laterally opposed mushroom-tubes 22 each having a dome or combustion head 24 and a longitudinal axis 19, preferably four pairs or eight in number, a cylindrical shaped thermal expansion wall 26 and an annular shaped partition wall 28 having a central, circular opening 29. The combustion assembly 17 accordingly comprises in the preferred embodiment eight combustion units 18, each "unit" including a single mushroom-tube 22 and is further defined by those structural components within a sector of a cylinder having a traverse 45 degree arc having as its apex and axis, longitudinal axis 16, and having one boundary which begins at the front of the combustion head 24 of mushroom-tube 22 and ends at the proximal surface of partition wall 28. Liner wall 14 is unitary with and connected to lateral annular-shaped, headplate 20. The outer peripheral edges of partition wall 28 and outer expansion wall 26 are unitary with internal surface 34 of intermediate wall 12. Similarly the outer peripheral edges of headplate 20 are unitary with the internal surface 36 of liner wall 14 to which it is connected. Mushroom-tubes 22 extend through inner circular openings 37 formed in headplate 20. As will be noted, the distal end 38 of intermediate wall 12 is spaced slightly from distal end 8, the extent of separation not being particularly critical provided only that it be consistent with the flow parameters to be maintained during actual operation of the combustion chamber 2. The aforesaid construction provides a continuous U-shaped flow space connecting, i.e. intercommunicating proximal fuel feed end 6 and combustion units 18, the directional flow being indicated by arrows 40. The number of combustion units 18 may range from four to ten depending upon design requirements, preferably four pairs, eight in number. In the preferred embodiment, they are all arranged so that their front portions or boundary lie in the same traverse plane and laterally opposed pairs are arranged so that their longitudinal axis 19 are in a plane which goes through major axis 16. As such, the inner portions of laterally opposed units define with a center body assembly 41 a cylindrical shaped oxidant or air flow channel, generally air, indicated at 42 in the drawing and having a longitudinal axis coincidental with major axis 16 of combustion chamber 2. As will be seen, combustion units 18, in conjunction with liner wall 14 and internal surface 34 of intermediate wall 12, define, respectively, combustion and oxidant zones 44 and 46 which intercommunicate only by air channel 42.

Combustion units 18 are preferably arranged in such a manner that combustion tube 22 and its combustion head 24 are spaced from liner wall 14 to provide good air and fuel mixing.

Air ducts or air inlet strut 48, preferably four in number, penetrating casing 4, provide means for admitting air to oxidant zone 46. The air so provided, usually from a compressor (not shown), enters oxidant zone 46 under pressure and flows through air channel 42 and is channeled by center body assembly 41 through its inner inlet ports 50 into combustion zone 44, its flow path being indicated by dotted arrows 52. This relatively high pressure air, approximately half of the primary combustion air, is directed to provide active mixing with the fuel emerging from combustion units 18. The remaining primary air for feeding fuel combustion is admitted to combustion zone 44 through outer inlet ports 54 which penetrate casing 4. The number of outer air inlet ports 54 provided in the casing may vary over a relatively wide range, e.g., from four to twenty, preferably eight, and are distributed over the circumference of combustion zone 44 to achieve maximum effect.

In operation, low BTU fuel is fed to proximal end 6, as indicated, whereupon it traverses the U-shaped flow path indicated by arrows 40, through annular spaces 11 and 13, into combustor units 18 of combustion assembly 17 for firing. A liquid fuel starting system 56 (only one of which is shown) together with a retractable atomizer and spark plug (not shown) as are well known in the art, are used to ignite the combustion process resulting in flame 53.

Referring now to FIGS. 2 and 3, the preferred embodiment, which is described by utilizing primed reference numerals to indicate corresponding parts in both embodiments, a combustion chamber generally designated 2', and here illustrated in FIG. 3 as being of essentially cylindrical cross-section, comprises a casing 4' terminating in necked down proximal fuel feed end 6' and longitudinally opposed distal end 8'. Casing 4' consists of spaced apart outer wall 10', intermediate wall 12' and inner or liner wall 14'; outer and inner annular spaces 11' and 13', respectively, are defined by outer and intermediate walls 10' and 12', respectively, and intermediate and inner walls 12' and 14', respectively. The intermediate wall 12' extends from distal end 8' to near the proximal fuel feed end 6'. The inner or liner wall 14' extends from distal end 8' to a traverse plane 15', which plane is perpendicularly oriented with respect to a major or longitudinal axis 16' of combustion chamber 2'. A combustion assembly generally designated 17' having a longitudinal axis which is coincidental with major axis 16' is provided and is disposed within and supported by casing 4'. The combustion assembly 17' comprises a lateral, disk-shaped wall or headplate 20' having a single, centrally located, circular opening 121 and a plurality of symmetrically spaced circular openings 123, a number of laterally opposed mushroom-tubes 22' each having a dome 24' and a longitudinal axis 19', preferably four pairs or eight in number, a plurality of air baffle means or cup-shaped baffle members 125 disposed over said openings 123 and 121 in the headplate 20' with each of said cup-shaped baffle members having side holes 126 and an end slot 127 except for the center one in opening 121 which is of slightly different design and has only side holes 126, a cylindrical shaped thermal expansion wall 26' and an annular shaped inner partition wall 28' having a central, circular opening 29' and an outer partition wall 128 having a central, circular opening 129. The combustion assembly 17' accordingly comprises in the preferred embodiment eight combustion units 18', each "unit" including a single mushroom-tube 22' and is further defined by those structural components within a sector of a cylinder having a traverse 45 degree arc having as its apex and axis, longitudinal axis 16′, and having one boundary which begins at the front of the combustion head 24′ of mushroom-tube 22′ and ends at the proximal surface of inner partition wall 28′. Liner wall 14′ is unitary with and connected to lateral disk-shaped, headplate 20′. The outer peripheral edges of inner partition wall 28′ and thermal expansion wall 26′ are unitary with internal surface 34′ of intermediate wall 12′. Similarly the outer peripheral edges of headplate 20′ and outer partition wall 128 are unitary with the internal surface 36′ of liner wall 14′ to which they are connected. Mushroom-tubes 22′ extend through inner circular openings 37′ and 137 formed in headplate 20′ and outer partition wall 128, respectively. As will also be noted, the distal end 38′ of intermediate wall 12′ is spaced slightly from distal end 8′, the extent of separation not being particularly critical provided only that it be consistent with the flow parameters to be maintained during actual operation of the combustion chamber 2′. The aforesaid construction also provides a continuous U-shaped flow space connecting, i.e. intercommunicating proximal fuel feed end 6′ and combustion units 18′, the directional flow being indicated by arrows 40′. The number of combustion units 18′ may range from four to ten depending upon design requirements, preferable four pairs, eight in number. In the preferred embodiment, they are all arranged so that their front portions or boundary lie in the same traverse plane and laterally opposed pairs are arranged so that their longitudinal axis 19′ are in a plane which goes through major axis 16′. Within partition walls 28′ and 128 and between thermal wall 26′ and the internal surface 34′ of intermediate wall 12′ is defined a fuel plenum chamber 131. An air plenum chamber 133 is provided to accommodate an increased supply of primary air and to insure an even pressure distribution to the combustor inlet zone and is defined by outer partition wall 128, the inner wall of headplate 20′ and a proximal portion of liner wall 14′ therebetween. As such, the proximal inner portions of laterally opposed units define a cylindrical shaped oxidant or air flow channel, generally air, indicated at 42′ in the drawing and having a longitudinal axis coincidental with major axis 16′ of combustion chamber 2′. As will be seen, combustion units 18′, in conjunction with liner wall 14′ and internal surface 34′ of intermediate wall 12′, define, respectively, combustion and oxidant zones 44′ and 46′ which intercommunicate only by air channel 42′.

Combustion units 18′ are preferably arranged in such a manner that combustion tube 22′ and its combustion head 24′ are spaced from liner wall 14′ to provide good air and fuel mixing.

Air ducts or air inlet strut 48′, preferably four in number, penetrating casing 4′, provide means for admitting air to oxidant zone 46′. The air so provided, usually from a compressor (not shown), enters oxidant zone 46′ under pressure and flows through air channel 42′ into air plenum chamber 133 and then through air baffle members 125 into combustion zone 44′, its flow path being indicated by dotted arrows 52′. This relatively high pressure air is directed to provide active mixing with the fuel emerging from combustion units 18′. The side holes 126 and end slots 127 are properly sized and oriented so as to insure the most efficient mixture of air and fuel. The centrally located air baffle member 125, disposed over opening 121, primarily functions to maintain the headplate 20′ cool.

Its operation is essentially the same except that all of the primary combustion air is admitted only through the air baffle members 125; the low BTU fuel is fed to proximal end 6′, as indicated, whereupon it traverses the U-shaped flow path indicated by arrows 40′ through annular spaces 11′ and 13′ into combustor units 18′ of combustion assembly 17′ for firing. A liquid fuel starting system 56′ (only one of which is shown) together with a retractable atomizer and spark plug (not shown) as are well known in the ar, are used to ignite the combustion process resulting in flame 53′. This embodiment is an improvement over that illustrated in FIG. 1 in that it tends to minimize fuel leakage through air inlet ports by eliminating the outer inlet ports 54.

As will be noted from the foregoing, the present invention utilizes the low BTU gas fuel as the primary coolant medium. Highly effective heat dissipation is achieved since the fuel makes a double pass around the combustion zone. In this manner, not only is temperature control of liner attained but the fuel by virtue of convection head transfer absorbs heat energy from the combustion chamber and is thus preheated leading to high power plant cycle and combustion efficiency. As will be observed, the fuel also provides means for returning heat to the system. Since large quqntities of low temperature, low BTU fuel are available to cool the combustor, higher combustion temperatures are permitted, i.e., temperatures approaching the stoichiometric maximum for the low BTU fuel selected. The cooling capability of the fuel enables effective mitigation of thermal stress thus increasing the useful life of the liner material. This is made possible since the liner can be maintained at a lower temperature despite the higher firing temperature prevailing in the immediate proximity of the combustion units.

It is an important feature of the present invention that the entire supply of incoming fuel be available for cooling purposes for the full extent of its flow path. By way of contrast, prior art systems employ only a single pass with portions of coolant medium being removed at intervals prior to completing its flow path traverse. Thus, only a portion of the initial quantity of coolant is available upon completion of the traverse. Moreover, where countercurrent single pass cooling is described in the art, it would appear that air cooling, rather than fuel cooling is contemplated.

Since the present invention minimizes the amount of cooling air, excess air is available for turbine inlet temperature profile control which reduces blade cooling requirements. Accordingly, higher gas generator turbine temperature levels are possible since more cooling air is available for blade and vane cooling.

The combustion chamber in practice is positioned within the engine compressor, delivery air plenum chamber assembly (not shown). The combustion process is conventional with the exhaust flame exiting into a transition duct and then to the gas turbine (not shown).

The structure may be modified to further include conventional means for facilitating heat transfer. Thus, the internal surfaces of the outer, intermediate, and liner walls can be provided with extended surface, e.g. fins, to provide lower temperatures and to reduce thermal gradients. Other means, such as spacers, dimples and the like, are less preferred since they may obstruct the flow of coolant.

Although described with particular reference to the use of low BTU gas as both fuel and coolant, it will be understood that the invention has broad applicability to combustion device wherein cooling may be a problem. Thus, the double pass system can be used with combustion chambers employing air or other material as the coolant or with liquid and/or gaseous fuels and coolants.

What is claimed is:

1. A combustion apparatus for burning a low BTU fuel and having a fuel feed end portion for receiving a low BTU fuel from a source thereof and a longitudinal, opposed distal end portion to pass products of combustion therefrom comprising
    (a) a casing of generally cylindrical shape having spaced apart outer and inner walls joined at their distal ends and an intermediate wall disposed to extend between the inner and outer walls to thereby define inner and outer annular spaces intercommunicating beyond the distal end portion of said intermediate wall;
    (b) said outer annular space being in communication with said fuel feed end portion to receive low BTU fuel;
    (c) wall means extending substantially normal to the inner and intermediate walls and connecting with the latter walls and defining a first plenum chamber communicating with said inner annular space to receive low BTU fuel from the inner and outer annular spaces;
    (d) said wall means defining an annular channel having a longitudinal axis coincident with the longitudinal axis of said combustion apparatus and in communication with a source of oxidant to receive oxidant from the latter;
    (e) a headplate disposed to extend in spaced relationship with said wall means and connected to the inner wall of the casing to define a second plenum chamber adjacent one side thereof and a combustion chamber on the opposite side thereof;
    (f) said second plenum chamber being in communication with said annular channel to receive oxidant from the latter;
    (g) port means in said headplate to pass oxidant from the second plenum chamber into the combustion chamber;
    (h) a plurality of combustor units supported in said headplate so as to extend through and out of communication with said second plenum and into said combustion chamber for communication with the latter; and
    (i) each of said combustor units being in communication with the first plenum chamber to receive low BTU fuel from the latter and to pass the same into the combustion chamber for admixture with the oxidant and combustion of the fuel.

2. The apparatus of claim 1 wherein said source of oxidant is a plurality of inlet ports symmetrically spaced around said casing and baffle means forming an inlet plenum chamber which communicates with said annular channel and said inlet ports to receive oxidant from the inlet ports and pass the same to said annular channel.

* * * * *